United States Patent [19]

Shimizu

[11] Patent Number: 5,143,686
[45] Date of Patent: Sep. 1, 1992

[54] CHUCK WITH FOUR DIFFERENTIAL JAWS

[76] Inventor: Tokichi Shimizu, 73-1, 2-Chome Umedacho, Kiryu-shi, Gunma Prefecture, Post Code 376-06, Japan

[21] Appl. No.: 571,651
[22] PCT Filed: Dec. 26, 1989
[86] PCT No.: PCT/JP89/01306
   § 371 Date: Sep. 4, 1990
   § 102(e) Date: Sep. 4, 1990
[87] PCT Pub. No.: WO90/07394
   PCT Pub. Date: Jul. 12, 1990

[30] Foreign Application Priority Data

Jan. 5, 1989 [JP] Japan .................................. 64-1083
Jan. 5, 1989 [JP] Japan .................................. 64-1084

[51] Int. Cl.⁵ .................................................. B23B 31/16
[52] U.S. Cl. ..................................... 279/110; 279/132
[58] Field of Search ................. 279/110, 107, 115, 71, 279/70, 1 L, 121, 1 D, 1 C, 1 J, 1 DA

[56] References Cited

U.S. PATENT DOCUMENTS

| | | | |
|---|---|---|---|
| 945,261 | 1/1910 | Blum | 279/110 |
| 1,193,141 | 8/1916 | Hartness | 279/110 |
| 2,363,709 | 11/1944 | Vidal | 279/110 X |
| 2,581,474 | 1/1952 | Evangelista | 279/114 |
| 2,775,461 | 12/1956 | Ehrlich et al. | 279/1 J |
| 2,880,009 | 3/1959 | Gamet | 279/1 J |
| 3,751,053 | 8/1973 | Swanson | 279/1 J X |
| 3,975,030 | 8/1976 | Akeel et al. | 279/1 J X |
| 4,102,539 | 7/1978 | Röhm | 279/114 |
| 4,938,491 | 7/1990 | Sumenko et al. | 279/121 X |

FOREIGN PATENT DOCUMENTS 846122 7/1981 U.S.S.R. .......................... 279/1 DC

*Primary Examiner*—Larry I. Schwartz
*Assistant Examiner*—Robert Schultz
*Attorney, Agent, or Firm*—Ladas & Parry

[57] ABSTRACT

A chuck with four differential jaws capable of holding an object of an irregular shape with even fixing force from four jaws by driving all four jaws disposed in a cross at right angle at the same time by a single operation. In the first type chuck, two jaws each are held opposingly on a front face of a chuck body, and these jaws are driven by a differential mechanism through jaw driving cams. The differential mechanism comprises a driving cam movable by movement of a drawing bar in axial direction along the axis and rotatable around the axis and a set of outer and inner differential cams each having a long hole provided so as to engage with the driving cam at the same time. These differential cams transmit an even fixing force to the jaws. The jaw driving cams are formed to be capable of conversion to types for inward fixing, outward fixing, and positioning. In the second type chuck, the differential mechanism comprises a set of outer and inner differential cams with an inner and outer toothed gear, respectively, and a driving disk with planet gears each engaging with both of the outer and inner differential cams at the same time.

6 Claims, 12 Drawing Sheets

CHUCK WITH FOUR DIFFERENTIAL JAWS

TECHNICAL FIELD

The present invention relates to a chuck with four differential jaws driven by a single operation of four jaws disposed in cross at right angle to hold an object of an irregular shape to be processed with even fixing forces.

PRIOR ART

Conventionally, in a case of machining using a lathe, to hold materials of an irregular shape such as a lozenge, an oblong and the like, specially, processing materials with rough shape and poor accuracy such as materials from gas-cutting, forging or casting, a single chuck with four jaws must be used, where, each of the jaws must be operated independently, requiring high skilled experiences for the centering, and moreover, more time are required compared with the case using a scroll chuck or a three- or two-direction fixing power chuck, resulting in considerable deteriorating of productivity.

Then, the present applicant has invented a power chuck with co-operating four jaws of a type of power-driven capable of differential and centripetal operations in two directions, and applied for a patent in Japan. The application was granted and registered as a patent right of Japan No. 1440379.

Said chuck is capable of fixing and machining materials of an irregular shape, for which a single-type chuck must be used so far, without any skilled experiences, and by a single operation, and requires almost same operating time compared with the conventional three- or two-direction fixing power chuck to render increasing of productivity.

For the power chuck described above, however, in order to hold a more complicated irregular object, in a case of two point inward fixing and two point outward fixing using 4 jaws disposed in cross at right angle, an alternative chuck body suitable for the holding type must be prepared and exchanged, and when the object is held in one point positioning or two point positioning system, a problem occurred that a single-type chuck with four jaws must also be used or a separate tool therefor must be used.

In the meantime, the present applicant completed another invention of a manually driven chuck with co-operating four jaws of a type of differential and centripetal operations in two directions capable of centering and holding an object of irregular shape with ease as a three-direction fixing scroll chuck and filed a patent applications in Japan as patent application No. 4530/1987 (publication No. 174805/1988, granted on Dec. 5, 1989), No. 4531/1987 (publication No. 174806/1988), and No. 4532/1987 (publication No. 174807/1988).

In the chuck with co-operating four jaws of a type of differential and centripetal operations in two directions described above, however, as four jaws disposed in two directions co-operate in differencial and centripetal direction, the chuck is applicable for centering and holding an irregular object, but in order to hold the object in a pre-determined position, another problem that the conventional single-type chuck with four jaws must be used or a separate tool therefor must be used is inevitable.

The present invention comprises a chuck with four jaws of the first type developed from the power driven chuck with co-operating four jaws capable of operation in differential and centripetal in two directions described above, and a chuck with four jaws of the second type provided with additional functions over the manually driven chuck with co-operating four jaws capable of operation in differencial and centripetal in two directions described above.

The first object of the present is to present a chuck with four differential jaws of a first type capable of, besides ordinary operation of four point inward fixing and four point outward fixing, various holding operations such as two point inward fixing, two point outward fixing, and further, of one point positioning and two point positioning without exchanging the chuck itself. Moreover, the operation is carried out in a single operation same as the scroll chuck.

The second object of the present is to improve rigidity and capability against wering of a chuck with four differential jaws of the first type to maintain precision and improve durability of the chuck as well as to enable production of a larger and stronger chuck.

The third object of the present is to present a manual type chuck with four differential jaws of a second type for easy holding and positioning of an irregular shape without special skill as well as to enable improving remarkably productivity of machining objects of an irregular shape.

Further object of the present is to improve rigidity and capability against wering of a chuck with four differential jaws of the second type to maintain its precision and improvement of durability of the chuck as well as to enable production of a larger and stronger chuck.

DISCLOSURE OF THE INVENTION

The present invention discloses a chuck with four differential jaws of the first type comprising four jaws two each held opposingly and slidably in jaw grooves formed in cross at right angle on a front face of a chuck body, a driving cam for differential cams movable by movement of a drawing bar in axial direction along the axis and rotatable around the axis, a set of cylindrical outer and inner differential cams each having a long hole provided in different angle to engage with said driving cam at the same time and being driven in counter directions by said movement of the driving cam in the axial direction so as to cause, when the rotation of one of said differential cams is restricted, the other differential cam is rotated differentially by the rotation and movement of the driving cam along the long hole on the restricted differential cam, and jaw driving cams each disposed inserted in a bore therefor provided in the chuck body and each consisting of an engaging projection to engage with one of said differential cams respectively and a jaw driving means to engage with each of said jaws, and further, said bore each being disposed on the center line of the jaw grooves formed in cross at right angle on a chuck body, and the jaw driving cams being formed to be capable of conversion to types for inward fixing, outward fixing and positioning.

Accordingly, the chuck with four differential jaws of the first type can be easily converted to various types of power chucks such as followings without exchanging the chuck body to carry out proper holding corresponding to the objects of various irregular shapes. When all the jaw driving cams in two directions are converted to cams of an inward fixing type or outward fixing type, a chuck of four point inward fixing or a chuck of four point outward fixing chuck is obtained. With two jaw driving cams in one direction converted to inward fixing type and two jaw driving cams in the other crossing direction converted to outward fixing type, a chuck of a type of a two point inward and two point outward fixing is obtained. Similarly, with one jaw driving cam in one direction converted to positioning type and the other three jaw driving cams all converted to inward or outward fixing type, a chuck of one point positioning and three point inward fixing or a chuck of one point positioning and three point outward fixing; With one each jaw driving cam in two directions converted to positioning type and the other two jaw driving cams converted to inward or outward fixing type, a chuck of two point positioning and two point inward fixing or a chuck of two point positioning and two point outward fixing; With two among three of the jaw driving cams in crossing directions, except the one of positioning, of the one point positioning type chuck mentioned above converted to a set of an inward fixing and an outward fixing, a chuck of one point positioning, one point inward and two point outward fixing or a chuck of one point positioning, one point outward and two point inward fixing; With two of the jaw driving cams in crossing directions, except the two of positioning, of the two point positioning type chuck mentioned above converted to a set of an inward fixing and an outward fixing, a chuck of two point positioning, one point inward and one point outward fixing can be obtained.

Further, in the chuck with four differential jaws of the first type, by providing a plurality of driving parts on the driving cam for differential cams, and, corresponding to the parts, by providing a plurality of long holes on each of the differential cams, the rigidity and incapability against wering of the chuck is improved to maintain precision and improve durability as well as to enable production of a larger and stronger chuck.

The present invention discloses a chuck with four differential jaws of the second type comprising four jaws two each held opposingly and slidably in jaw grooves formed in cross at right angle on a front face of a chuck body, said chuck body containing an outer differential cam of a shape of a ring with an inner toothed gear and a pair of semi-circular operating cams disposed opposingly on one diameter, an inner differential cam of a shape of a disk with an outer toothed gear and a pair of semi-circular operating cams disposed opposingly on one diameter and a driving disk with planet gears each engaging with both of said inner and outer gears of the outer and inner differential cams at the same time, and further, one of the said operating cams disposed opposingly on one or both of the outer and inner differential cams being formed in a nutral semi-circle with a constant radius and the other operating cam being formed in a semi-circular curve with increasing radius so as to hold a jaw engaged with the semi-circle operating cam in pre-determined position and remove differentially a jaw engaged with the semi-circular curve with increasing radius along centrifugal or centripetal directions.

Accordingly, in the chuck with four differential jaws of the second type, when the driving disk is operated by an external force and rotates in one direction and all of the jaws are free, both of the outer and inner differential cams, in a locked state by the planet gears, rotates with the planet gears in the same direction as the driving disk. Here, one jaw engaged with the operating cam of a semi-circular curve with increasing radius moves toward or against the center of the chuck, guided along the curve and according to the rotation of the differential cam, while, other jaws engaged with the operating cam of a nutral semi-circle does not move nor rotates in spite of the rotation of the outer differential cam and keeps its constant position.

And then, if any one of the jaws contacts to the object to stop its radial movement and the rotation of the differential cam relating thereto is restricted, then, the planet gears rotates, while revolving, and actuates the other differential cam to continue movement of the jaw relating thereto on the other direction. If the jaw contacts to the object to stop its movement, both of the outer and inner differential cams in a state locked together by the planet gears receive driving force from the driving disk to transmit even force to all of the jaws.

In short, in the chuck with four differential jaws of the second type, the object is positioned by one or two jaws engaged with one of circular operation cams with a constant radius disposed opposingly on one or both of the outer or inner differential cams, and then fixed with the other jaws to accomplish positioning and holding of the object can be carried out easily as conventional three direction scroll chuck or a chuck with co-operating four jaws of a type of differential and centripetal in two directions of pending patents.

Meanwhile, in the chuck with four differential jaws of the second type, with the circular operation cams disposed opposingly on the outer and inner differential cams in a shape of ribs connected on their ends to make a full circle, or, as an alternative aspect, by providing said operation cams disposed opposingly on the outer and inner differential cams in plural and parallel each other, rigidity and capability against wering are improved to maintain its precision and improvement of durability of the chuck as well as to enable production of a larger and stronger chuck.

BRIEF DESCRIPTION OF THE DRAWINGS

FIG. 1 is a cross sectional view of a main part;

FIG. 2 shows a front view with its half part in cross section;

FIG. 3 shows a vertical cross section of the chuck body;

FIG. 4 shows a front view of the half of the chuck body;

FIG. 5 shows a horizontal cross section of a jaw groove;

FIG. 6 through 8 each illustrates a master jaw in detail;

FIG. 6 is its side view;

FIG. 7 is its plan view;

FIG. 8 is its rear side view;

FIGS. 9 through 11 each illustrates a top jaw in detail;

FIG. 9 is its side view;

FIG. 10 is its plan view;

FIG. 11 is its front view;

FIG. 12 is a side view of a jaw driving cam of the first and the second type;

FIG. 13 is a front view of the jaw driving cam of the first type;

FIG. 14 is a front view of the jaw driving cam of the second type;

FIG. 15 is a side view of a jaw driving cam of the third and the fourth type;

FIG. 16 is a front view of the jaw driving cam of the third type;

FIG. 17 is a front view of the jaw driving cam of the fourth type;

FIG. 18 is a side view of a jaw driving cam of the fifth type;

FIG. 19 is a front view of the jaw driving cam of the fifth type;

FIGS. 20 through 22 illustrates an outer differential cam in detail;

FIG. 20 is its rear side view;

FIG. 21 is a cross sectional view along the line A—A in FIG. 20;

FIG. 22 is a developed view of its long hole;

FIGS. 23 through 25 illustrates an inner differential cam in detail;

FIG. 23 is its rear side view;

FIG. 24 is a cross sectional view along the line B—B in FIG. 23;

FIG. 25 is a developed view of its long hole;

FIG. 26 and FIG. 27 illustrates a driving cam for differential cams;

FIG. 26 is its front view;

FIG. 27 is its side view;

FIGS. 28 through 36 each illustrates converting mode of various chuck;

FIG. 28 is a chuck of mode of four point inward fixing;

FIG. 29 is mode of four point outward fixing;

FIG. 30 is mode of two point inward and two point outward fixing;

FIG. 31 is mode of one point positioning and three point inward fixing;

FIG. 32 is mode of one point positioning, one point outward fixing and two point inward fixing;

FIG. 33 is mode of one point positioning, one point inward fixing and two point outward fixing;

FIG. 34 is mode of two point positioning and two point inward fixing;

FIG. 35 is mode of two point positioning and two point outward fixing;

FIG. 36 is mode of two point positioning, one point inward fixing and one point outward fixing;

FIG. 37 is perspective views of other examples of converting means of jaw driving cam;

FIG. 38 is a cross section of another example of driving cam for differential cams;

FIG. 39 is a general vertical cross section;

FIG. 40 is a general side view;

FIG. 41 is a general front view;

FIG. 42 is a front view of an outer and inner differential cams of a type of one point positioning three direction differential mode;

FIG. 43 is a cross sectional view along the line A—A in FIG. 42;

FIG. 44 is a front view of a drive disk;

FIG. 45 is a cross sectional view along the line B—B in FIG. 44;

FIG. 46 is a front view of an outer and inner differential cams of a type of two direction positioning two direction differential mode.

BEST EMBODIMENT TO CARRY OUT THE INVENTION

Figure 1:
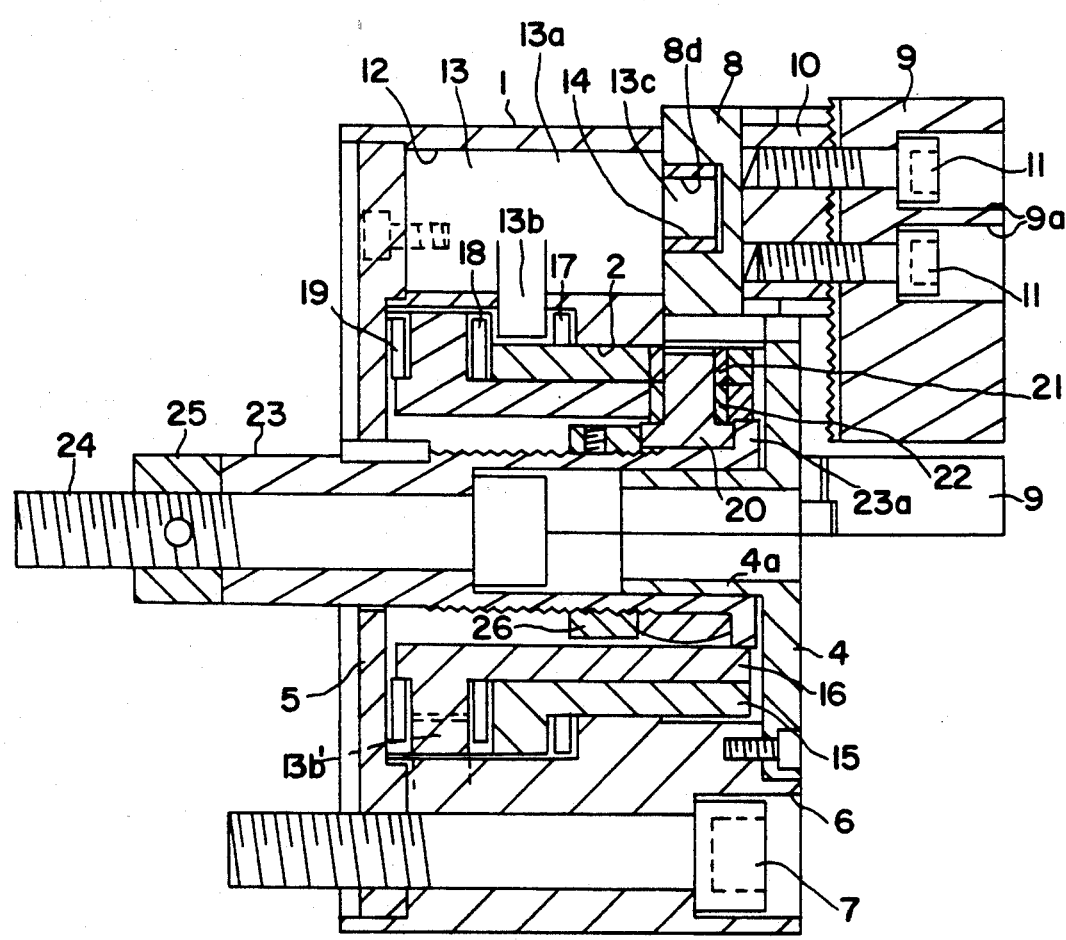
FIG. 1 through FIG. 38 show an embodiment of a chuck with four differential jaws of the first type of the present invention.

The construction of a chuck with four differential jaws of the present invention is explained in detail based on a preferable embodiment.

The embodiment shown in FIG. 1 through 38 represents an example of a power chuck with four differential jaws of the first type for positioning on one point and fixing on three points.

As shown in FIGS. 1 through 5, a chuck body 1 is configured in a shape of horizontal cylinder, and in the center thereof, a bore hole 2 for differential cams is provided. On the front of the chuck body 1, grooves 3 in a cross at right angle along diameters of the cylinder are formed. Reference numeral 4 indicates a front cover fixed on the front side by screws, and numeral 5 indicates a back cover fixed on the back side by screws, then, numeral 6 indicates screw holes for fixing screws 7.

In the jaw grooves 3 in a cross, master jaws 8, 4 in total and 2 each opposingly disposed in each groove 3, are held slidably. The master jaw 8, as shown in detail in FIGS. 6 throgh 8, comprises, on its sides, two vertical projections 8a to engage with recessed engaging parts 3a formed on each of the jaw grooves 3, on its front, two rows of serrated surfaces 8b to engage with the same on a top jaw 9 to be described later and a central groove 8c deviding the surfaces 8b for incorporating a fixing means for the top jaw 9, and, on its back, a groove 8d in transverse direction for engaging with a jaw driving means 13c of jaw driving cams 13, also to be described later, formed in a set of 5 kinds of configurations of $13_1$, $13_2$, $13_3$, $13_4$ and $13_5$.

Figure 9:
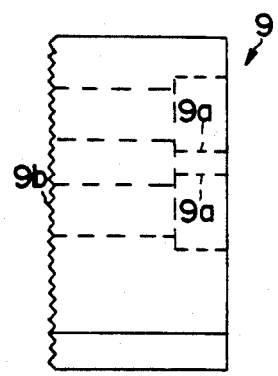
Figure 10:
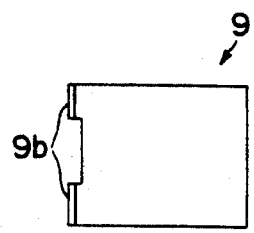
Figure 11:
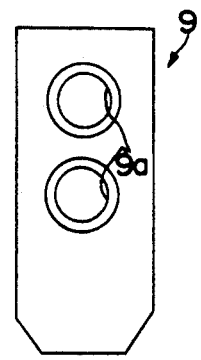

The top jaw 9, as shown in detail in FIGS. 9 through 11, provides two bores 9a for fixing bolts from its front to its back, and provides, on its back side, rows of serrated surfaces 9b to engage with the serrated surfaces 8b on the front of the master jaw 8. With a T-nut 10 (FIG. 1) inserted in the groove 8c of the master jaw 8, and engaging the serrated surfaces 8b and 9b with each other, and by means of fixing bolt 11 (FIGS. 1, 2) inserted in the bolting bores 9a to screw in the T-nut 10, the top jaw 9 is fixed to the master jaw 8.

Figure 12:
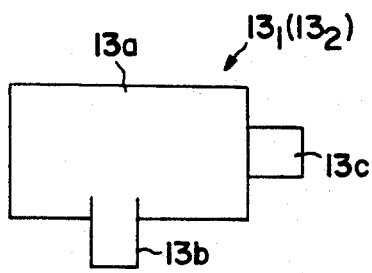
Figure 13:
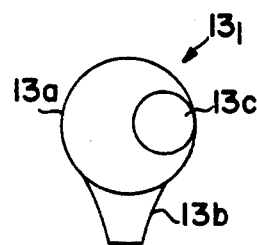
Figure 14:
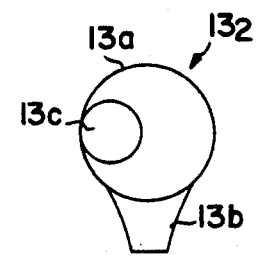
Figure 15:
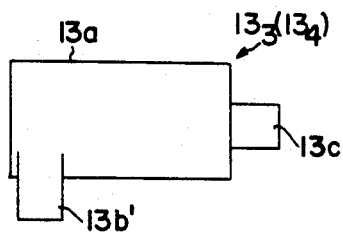
Figure 16:
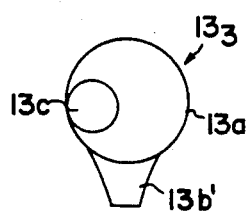
Figure 17:
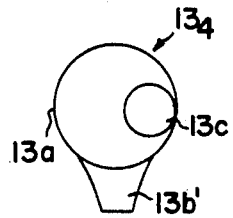

On the center lines of crossing grooves 3 of the chuck body 1, and on a circle of same radius, four bores 12 for the jaw driving cams 13 are formed. In these bores 12, one of 5 kinds of the jaw driving cams 13 in a form of shaft, such as $13_1$, $13_2$, $13_3$, $13_4$ and $13_5$ are held interchangeably, as shown in FIGS. 12 through 19. FIGS. 13 and 16 show two types of inward fixing, FIGS. 14 and 17 show two types of outwar dixing, and FIG. 19 shows one type of positioning driving cams 13 respectively.

The first and second type jaw driving cam $13_1$, $13_2$ is a type of inward fixing and a type of outward fixing respectively to be driven by an outer differential cam 15 to be described later. As shown in FIGS. 12 through 14, the cam 13 consists of its shaft body 13a and an engaging projection 13b in a form of a tooth on its one side and a jaw driving meams 13c in a form of a pin on its one end. The projection 13b, disposed on middle part, engages with a driving notch 15c of the outer differential cam 15, and when held with the projection 13b downward, the pin 13c is disposed on the end excentric to the right in the first type (FIG. 13), to the left in the second type (FIG. 14).

The third and fourth type jaw driving cam $13_3$, $13_4$ each is a type of inward fixing and of outward fixing type to be driven by an inner differential cam 16 to be described later. As shown in FIGS. 15 through 17, the cam 13 consists of its shaft body 13a and a projection 13b' on its one side and a jaw driving pin 13c on its one end. The projection 13b', disposed near one end, engages with a driving notch 16c of the inner differential cam 16, and when held with the projection 13b' downward, the pin 13c is disposed on the end eccentric to the right in the third type (FIG. 16), to the left in the fourth type (FIG. 17).

Figure 18:
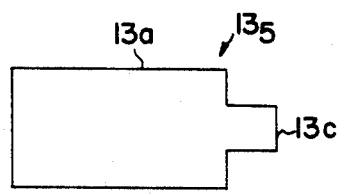
Figure 19:
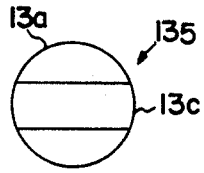

Next, as shown in FIGS. 18 and 19, the fifth type jaw driving cam $13_5$ is a type of positioning without the projection on the shaft body 13a, and on its end, a jaw driving means 13c is projected crosswise configurated in a shape of a rib with two parallel planes.

As described before, bores 12 for the jaw driving cam 13 being provided on the center lines of crossed grooves 3, when the jaw driving cams $13_1$, $13_2$, $13_3$, $13_4$ with eccentric jaw driving pins 13c are inserted in the bores 12, jaw driving pins 13c eccentric either to the right or to the left also locate in the groove 3 in symmetric position against the center line thereof. Accordingly, the jaw driving pins 13c transmit even power to the master jaws 8.

Figure 20:
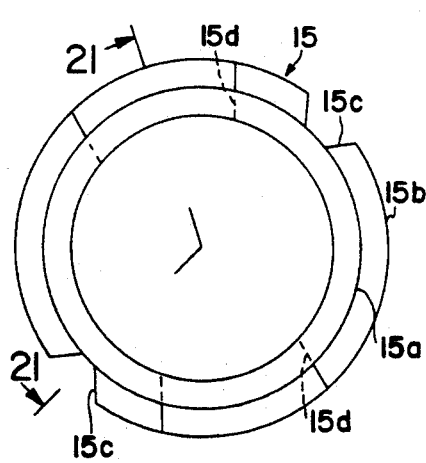
Figure 21:
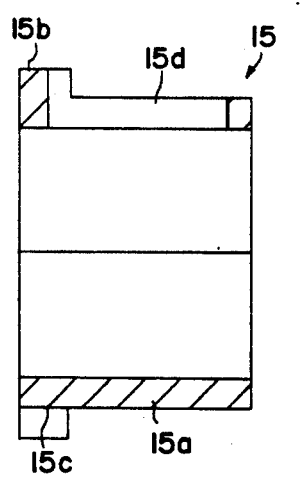
Figure 22:
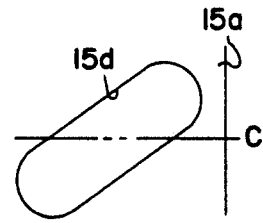

Meanwhile, in the bore hole 2 for a differential cam provided in the chuck body 1, the outer differential cam 15 in a shape of a cylinder is held rotatably. Said cam 15, as shown in FIGS. 20 through 22, consists of a cylindrical part 15a and a flange part 15b. On the circumference of the flange 15b, on opposite positions, a pair of driving notches 15c are provided for engaging with the projection 13b of the jaw driving cams $13_1$ and $13_2$ of the first type and the second type, and on the circumference of the cylindrical part 15a, on opposite ends of a diameter, a pair of long holes 15d in the direction with a diagonal angle to the axis C are provided.

Figure 23:
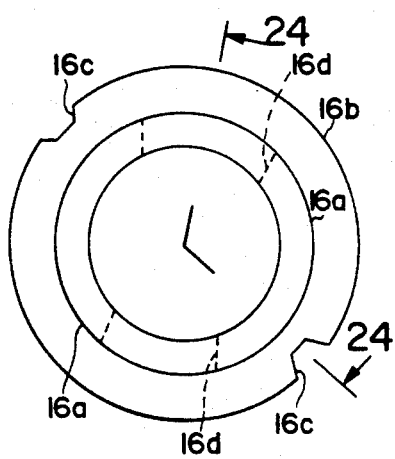
Figure 24:
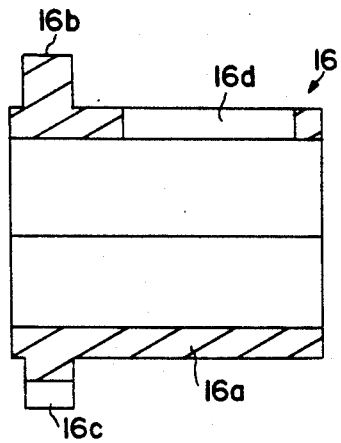
Figure 25:
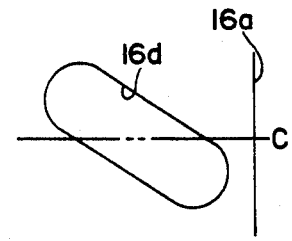

In the outer differential cam 15, the inner differential cam 16 in a similar shape to the outer differential cam 15 is inserted rotatably. Said cam 16, as shown in FIGS. 23 through 25, consists of a cylindrical part 16a and a flange part 16b. On the circumferance of the flange 16b, on opposite positions, a pair of driving notches 16c are provided for engaging with the engaging projection 13b' of the jaw driving cams $13_3$ and $13_4$ of the third and the fourth type, and on the circumferance of the cylindrical part 16a, on opposite ends of a diameter, a pair of diagonal long holes 16d in the direction with a reverse angle to the axis C are provided.

Figure 2:
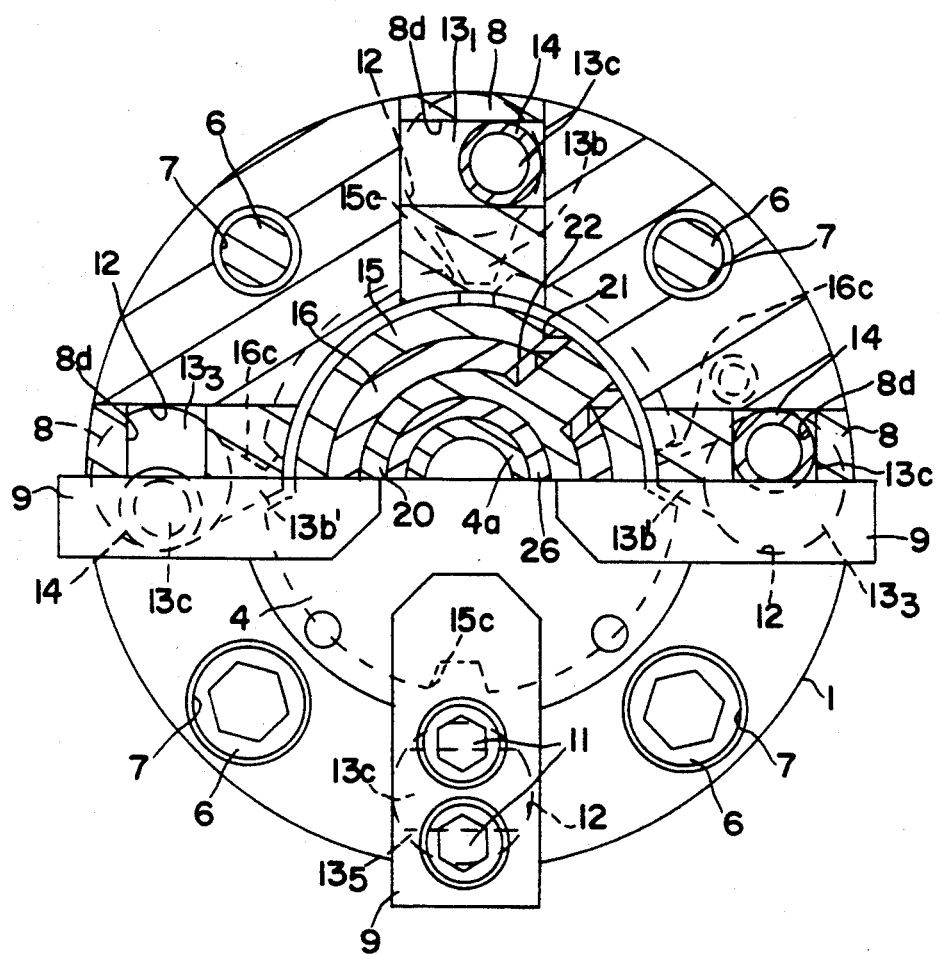
Figure 3:
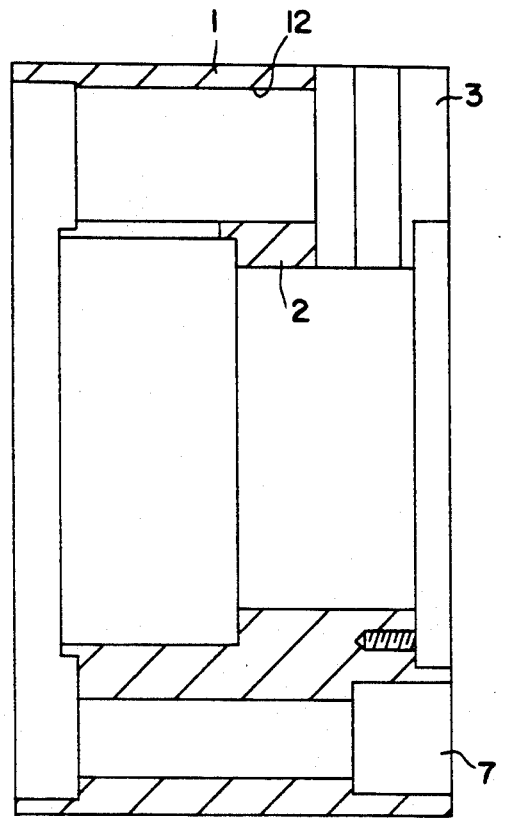
Figure 4:
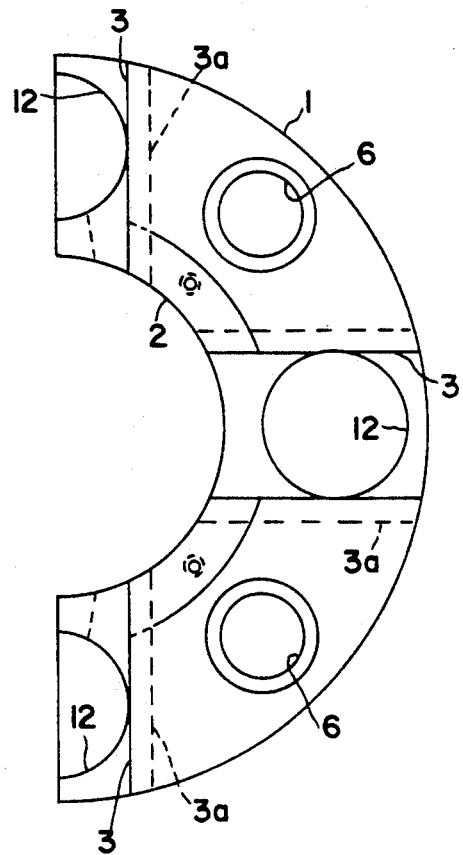
Figure 5:
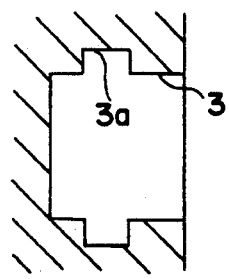
Figure 6:
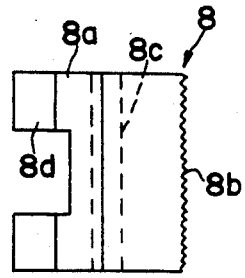
Figure 7:
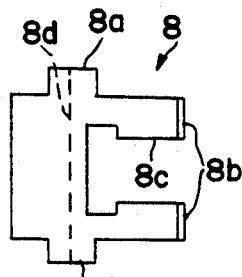
Figure 8:
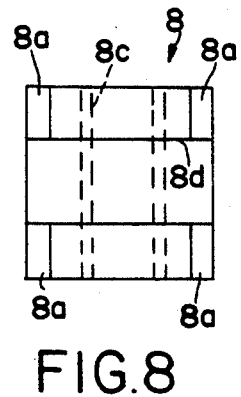

In the embodiment of a chuck of a type of one point positioning and three point fixing shown in FIG. 2, the jaw driving cam $13_1$ of the type 1 is inserted in the upper bore 12 of one of the jaw grooves 3 (at top in FIG. 2), the jaw driving cam $13_5$ of type 5 is inserted in the other bore 12 of the jaw groove 3 (at bottom in FIG. 2), and the jaw driving cams $13_3$, $13_3$ of type 3 are inserted in the bore 12 disposed on the other jaw groove 3 (at right and left side in FIG. 2). While, the projection 13b of the jaw driving cam $13_1$ of type 1 mentioned above engages with the driving notch 15c of the outer differential cam 15, and the projection 13b' of the jaw driving cam $13_3$ of type 3 engages with the driving notch 16c of the inner differential cam 16 respectively. The jaw driving means 13c formed as pins and a rib for each of the jaw driving cam $13_1$, $13_3$, $13_5$ engages with the master jaw 8. Numeral 14 indicates a collar for preventing wearing fixed around the jaw driving pins and rib 13c of the jaw driving cam $13_1 \sim 13_5$ of type $1 \sim 5$.

Between the contacting surfaces of the flange part 15b of outer differential cam 15 and the chuck body 1, between the contacting surfaces of the flange part 15b of outer differential cam 15 and the flange part 16c of inner differential cam 16, and between the flange part 16c of inner differential cam 16 and the back cover 4, thrust-needle-bearings 17, 18 and 19 are interposed respectively.

Figure 26:
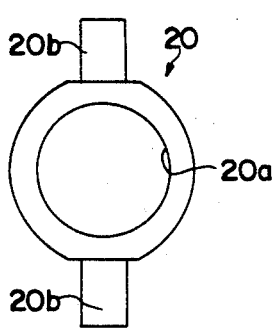
Figure 27:
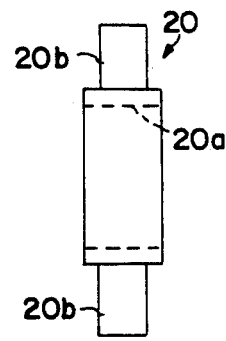

Reference numeral 20 indicates driving cam for differencial cams and the cam 20, as shown in detail in FIGS. 26 and 27, is a ring body comprising a large hole 20a and a pair of driving parts 20b for the differencial cams made of rod projecting outward from the body. The driving parts 20b are inserted through and engaged with both of the diagonal long holes 15d and 16d of the outer and inner differential cams 15 and 16 when assembled together. On the driving parts 20b, two collar 21 and 22 are fixed between the long holes 15d and 16d to prevent its wearing. And, through the hole 20a, a tubular draw-bar 23 is inserted.

The front end of the draw-bar 23 is, as shown in FIG. 1, supported on a boss 4a provided on the inside of the center of the front cover 4 and its rear end penetrates through the center of the back cover 5 and a draw-rod 24 is inserted and fixed by means of a nut 25 to be connected to a hydraulic or pneumatic power cylinder (not shown). The front part of the draw-bar 23 is inserted through the above-mentioned driving cam 20 and the driving cam 20 is rotatable while is restricted between the flange 23a on the front end of the draw-bar 23 and the nut 26 screwed on the draw-bar 23.

Figure 39:
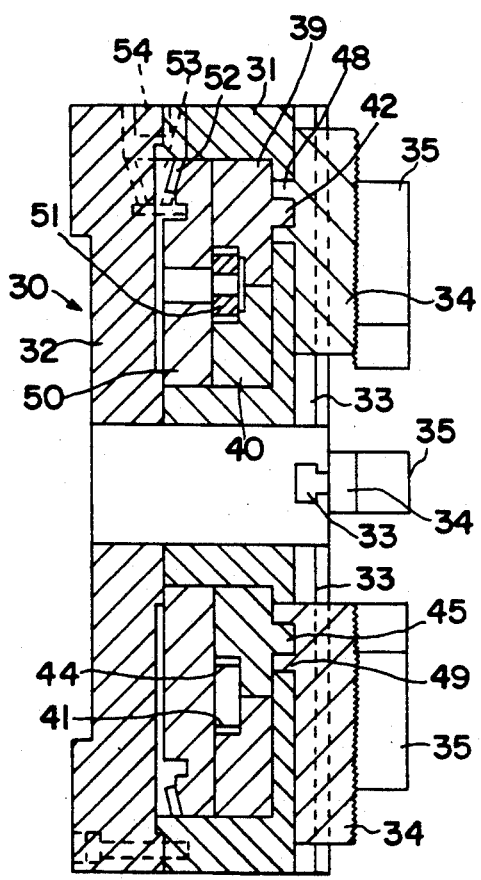
FIGS. 39 through 46 show an embodiment of a chuck with four differential jaws of the second type of the present invention.
Figure 40:
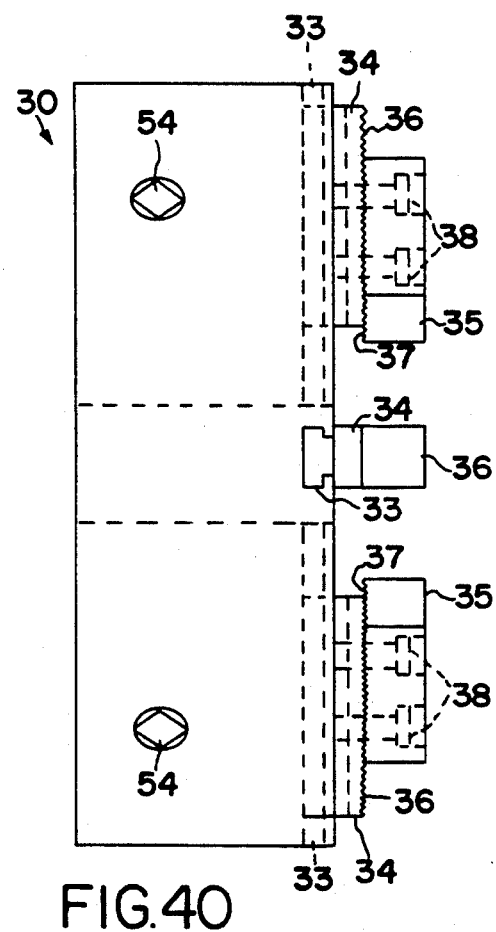
Figure 41:
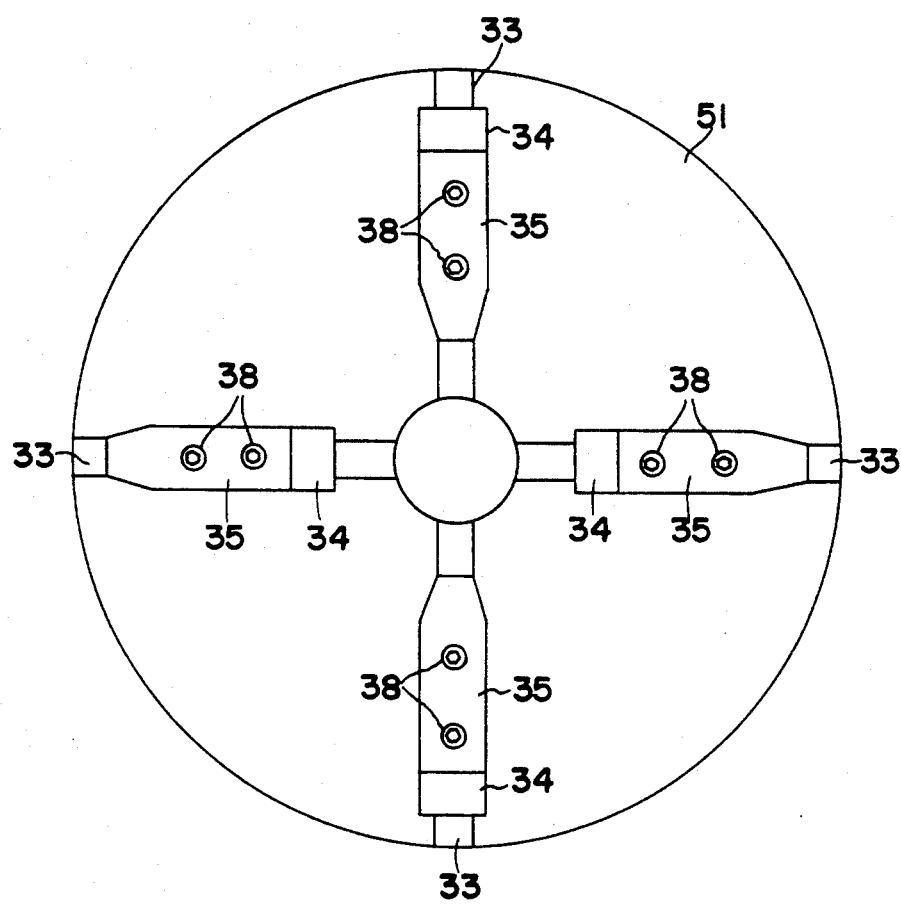

The embodiment shown in FIGS. 39 through 46 represents an example of a chuck with four differential jaws of the second type. In FIGS. 39 through 41, a cylindrical chuck body 30 of the chuck with four differential jaws comprises a body front 31 and a body back 32 provided at the back thereof. In the front of the body front 31, jaw grooves 33 are formed along its diameters crossing each other at right angle. In the jaw grooves 33, master jaws 34, 4 in total, two each opposing in a groove in one direction, are held slidably. In front of each of the master jaws 34, a top jaw 35 is fixed with their serrated surfaces 36 and 37 provided on their contacting surfaces engaging with each other by means of fixing bolt 38.

Figure 42:
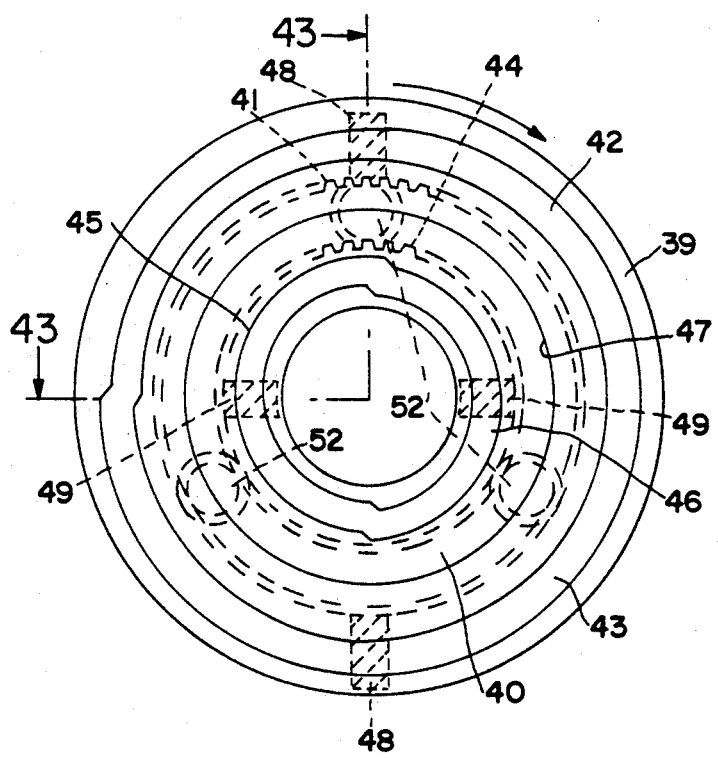
Figure 43:
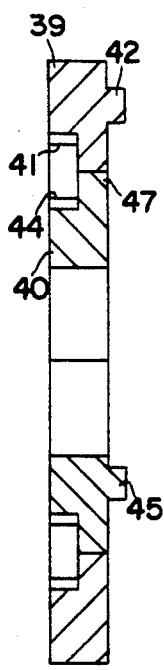

In the chuck body 30, a circular outer differential cam 39 and an inner differential cam 40 in a shape of a disk are supported concentrically and rotatably. FIGS. 42 and 43 show the outer differential cam and the inner differential cam in detail. The outer differential cam 39 has an inner toothed gear 41, a pair of semi-circular operating cam 42, 43 (projecting outward in the drawing) on its front opposing on a diameter, and the inner differential cam 40 has an outer toothed gear 44, a pair of semi-circular operating cam 45, 46 (projecting outward in the drawing) on its front opposing on a diameter. Thus, as for both of the differential cams 39 and 40, with their opposing operating cams 42, 43 and 44, 45 disposed at right angle with each other, the inner differential cam 40 is fitted in a large central hole 47 of the outer differential cam 39. Then, each of the operating cam 42, 43 of the outer differential cam 39 engages with receiving member 48 (recessed inward in the drawing) formed at the rear side of the master jaw 34 disposed in a direction of one diameter of the chuck body 30, and each of the operating cam 45, 46 of the inner differential cam 40 engages with a receiving member (recessed inward in the drawing) 49 formed at the rear side of the master jaw 34 disposed in a direction of other diameter of the chuck body 30.

In the embodiment, for the pair of operating cams 42, 43 located in a direction of one diameter of the outer differential cam 39, one cam 42 is formed in a semi-circular curve with its radius increasing in clockwise seen from the front, and the other cam 43 is formed in a nutral semi-circle with a constant radius, while, for the operating cams 45, 46 located in a direction of a diameter of the inner differential cam 40, both of the cams 45, 46 are formed in a semi-circular curve with their radii increasing in clockwise seen from the front. Here, the ends of projecting cams 42, 43 and 45, 46, are connected each other to make a continuous circular ribs to reinforce each other obtaining rigidities.

Figure 44:
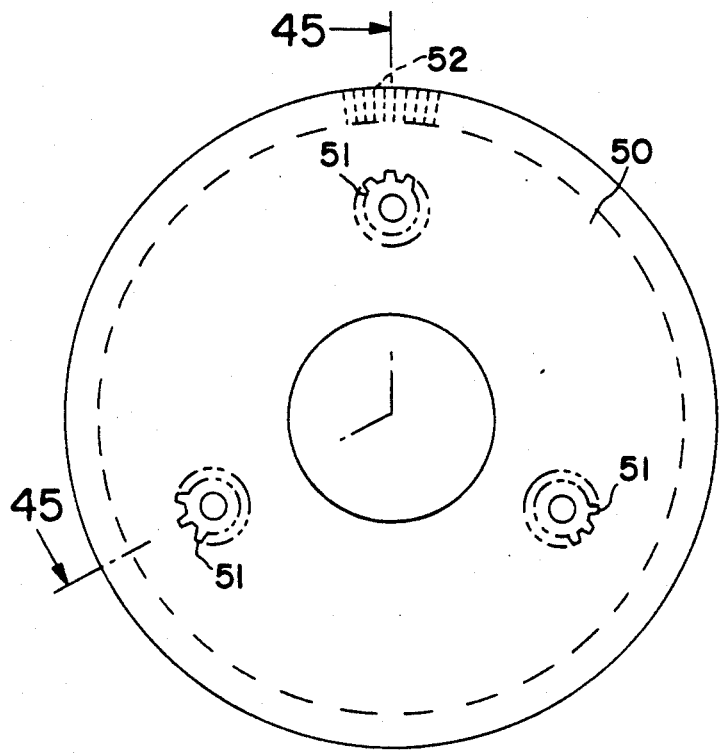
Figure 45:
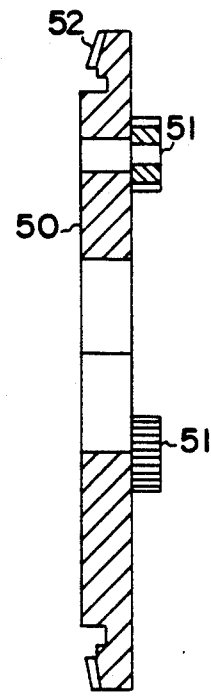

At the back of the outer differential cam 39 and the inner differential cam 40, a driving disk 50 is held concentrically and rotatably. On the front face of the driving planet gear 50, as shown in FIG. 44 and 45, three planet gears 51 are supported rotatably and on the periphery of the disk 51, a bevel gear 52 is toothed. Thus, the disk 51 engages with the outer differential cam 39 and the inner differential cam 40 on their outer gear and inner gear at the same time and the bevel gear 52 engages with a bevel pinion 53 provided on peripheral part of the chuck body 30. The number of the planet gear 51 is not limited to three and can be four to strengthen holding force of the chuck.

OPERATION

Next, the operation of the present invention shall be explained.

In the chuck with four differential jaws, when the draw-bar 23 is moved along the axis C by the exterior power cylinder, the driving cam 20 for the differential cams also moves in the direction of the axis C. Thus, the driving part 20b of the driving cam 20 moves in the long holes 15d and 16d of the outer differential cam 15 and the inner differential cam 16 in common, which crosses each other in different direction, causing, then, the rotation in counter direction, when the rotation of both of the differential cams 15 and 16 are not restricted, i.e. all of the top jaws 9 are free.

Here, when the outer differential cam 15 rotates anticlockwise seen from the front and the inner differential cam 16 rotates clockwise, jaw driving cam $13_1$ of type 1 shown in upper part of FIG. 2 rotates clockwise driven by the outer differential cam 15 rotating anti-clockwise and the jaw driving pin 13c, eccentric to the right, moves the master jaw 8 toward the center of the chuck.

Meanwhile, jaw driving cam $13_5$ of type 5 disposed on the lower side, having no engaging projection, does not rotates and holds the master jaw 8 engaged therewith in its pre-determined position. On the jaw driving cams $13_3$ of type 3 disposed on the both sides rotates anti-clockwise driven by the inner differential cam 16 rotating clockwise and the jaw driving pin 13c, eccentric to the left, removes the master jaw 8 toward the center of the chuck.

With a pre-determined point contacted to one of the top jaws 9 adjustably fixed by fixing bolts 11 to the master jaw 8 held on pre-determined position, the processing object is positioned, and when any one of the three top jaws 9 moving to the center stops by contacting to the object, rotation of the outer or inner differential cams 15 or 16 driving the top jaw 9 concerned is restricted. Then, the driving part 20b of the driving cam 20 slides guided along and in the long holes 15d or 16d of the outer or inner differential cams 15 or 16, and accordingly, moves in the long holes 15d or 16d of the outer or inner differential cams 15 or 16 which are not restricted to rotate them, then, causing to remove top jaws 9 co-operating with the outer or inner differential cams 15 or 16. When the top jaws 9 contact to the object, the rotation of the outer or inner differential cams 15 or 16 stops and the driving part 20b of the driving cam 20 delivers even driving force to the long holes 15d and 16d of both of differential cams 15 or 16 and the top jaws 9 in three directions acts on the object in even fixing force in the direction toward the center of the chuck. Therefore, the object is positioned on one point and fixed by even fixing force on three points by the top jaws moved differentially corresponding to the irregular shape thereof. That means chucking by the one point positioning and three point inward fixing of the object is carried out by a single operation of drawing the draw-bar.

Figure 28:
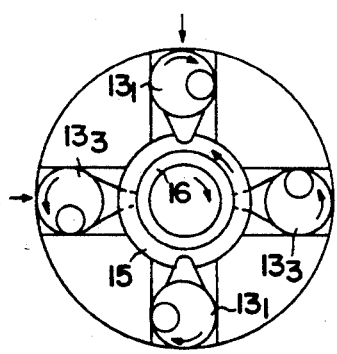
Figure 29:
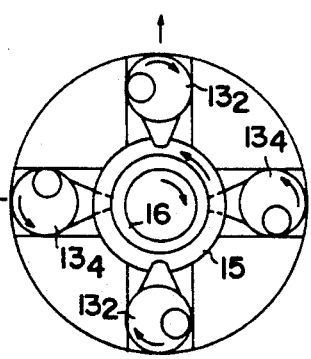
Figure 30:
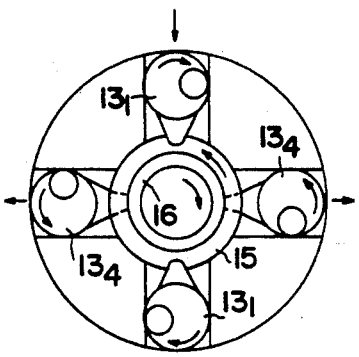
Figure 31:
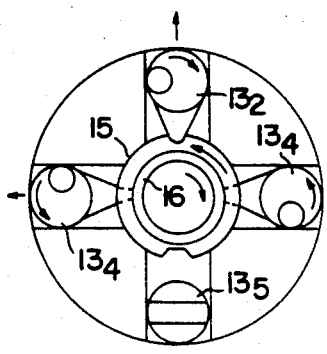
Figure 32:
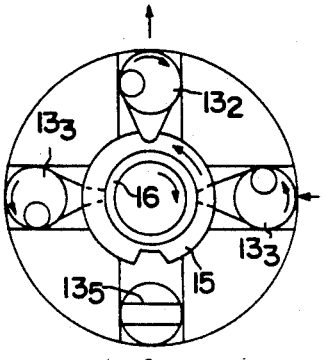
Figure 33:
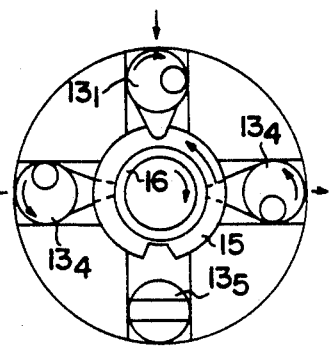
Figure 34:
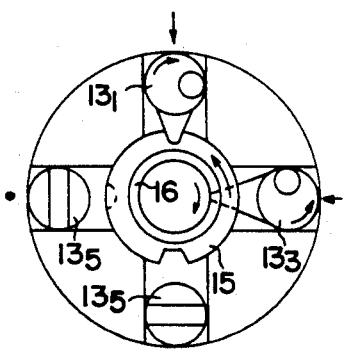
Figure 35:
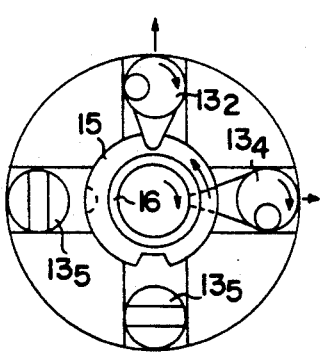
Figure 36:
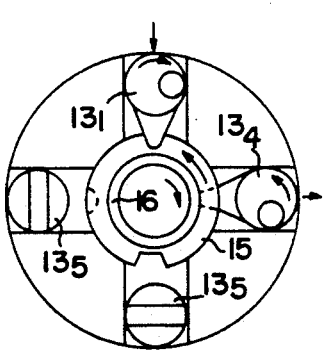

Besides the fashion of one point positioning and three point inward fixing described above, converting mode of various chucks by interchanging the jaw driving cams $13_1$, $13_2$, $13_3$, $13_4$, $13_5$ of type 1 through 5 are shown in FIGS. 28 through 36. FIG. 28 shows a conventional chuck of four point inward fixing with all four of the jaw driving cams disposed in two crossing direction converted to inward fixing type (type 1 of $13_1$, type 3 of $13_3$). FIG. 29 shows a chuck of four point outward fixing with all four of the jaw driving cams disposed in two crossing direction converted to outward fixing type (type 2 of $13_2$, type 4 of $13_4$). FIG. 30 shows a chuck of two point inward and two point outward fixing with two jaw driving cams in one direction converted to inward fixing type (type 1 of $13_1$) and two jaw driving cams in other crossing direction converted to outward fixing type (type 2 of $13_2$). FIG. 31 shows a chuck of one point positioning and three point outward fixing with one jaw driving cam in one direction converted to posioning type (type 5 of $13_5$) and other three jaw driving cams converted to outward fixing type (type 2 of $13_2$, type 3 of $13_3$). FIG. 32 shows a chuck of one point positioning, one point outward and two point inward fixing with one jaw driving cam in one direction converted to positioning type (type 5 of $13_5$), one jaw driving cam disposed on the other side of the direction converted to outward fixing type (type 2 of $13_2$) and two jaw driving cams in other crossing direction converted to inward fixing type (type 3 of $13_3$). FIG. 33 shows a chuck of one point positioning, one point inward and two point outward fixing with one jaw driving cam in one direction converted to posioning type (type 5 of $13_5$), one jaw driving cam disposed on the other side of the direction converted to inward fixing type (type 1 of $13_1$) and two jaw driving cams in other crossing direction converted to outward fixing type (type 4 of $13_4$). FIG. 34 shows a chuck of two point positioning and two point inward fixing with two jaw driving cams disposed on one side of two directions converted to posioning type (type 5 of $13_5$) and other two jaw driving cams on the other side converted to inward fixing type (type 1 of $13_1$, type 3 of $13_3$). FIG. 35 is a chuck of two point positioning and two point outward fixing with two jaw driving cams disposed on one side of two directions converted to posioning type (type 5 of $13_5$) and other two jaw driving cams on the other side converted to outward fixing type (type 2 of $13_2$, type 4 of $13_4$). FIG. 36 is a chuck of two point positioning, one point inward and one point outward fixing with two jaw driving cams disposed on one side of two directions converted to posioning type (type 5 of $13_5$), two jaw driving cams disposed on the other side of the crossing directions converted to inward fixing type (type 1 of $13_1$) and to outward fixing type (type 4 of $13_4$) in counter direction each other.

Figure 37:
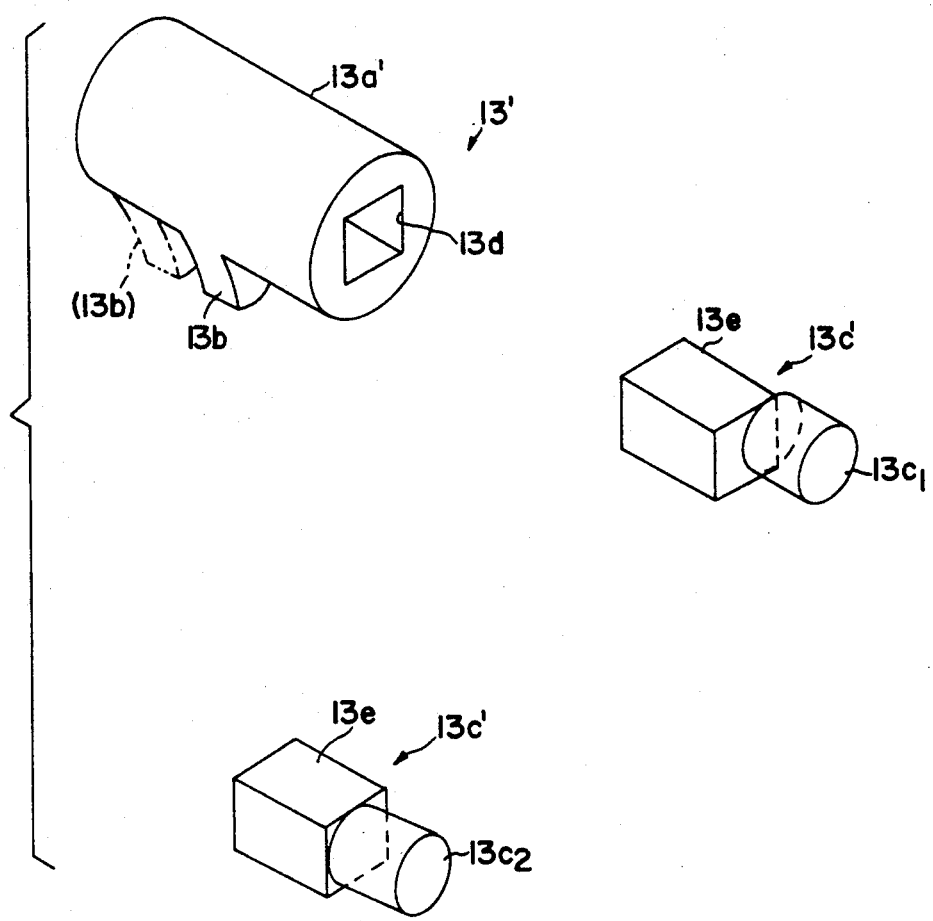

The means of conversion of the jaw driving cams to types of inward, outward and positioning described above are carried out by inserting the jaw driving cams provided with the inward, outward and positioning jaw driving part into the bore holes, but, in FIG. 37, another means of conversion are shown so as to interchange the jaw driving cam by providing various types of jaw driving parts for making inward, outward and positioning cams by assembling with the main body of the cam in common.

In the drawing, a jaw driving cam 13' consists of a main body 13a' and a separate jaw driving part 13c' and the main body 13a' is formed in two way to have engaging projection 13b to engage with the driving notch 15c of the outer differential cam 15 and to have engaging projection 13b' to engage with the driving notch 16c of the inner differential cam 16, both of which have a square hole 13d in the center of the end.

The jaw driving part 13c' is formed in two way to have its projecting jaw driving pin $13c_1$ in eccentric (middle) position, and to have its projecting jaw driving pin $13c_2$ in center in nutral position (bottom).

When the eccentric driving pin $13c_1$ is inserted in the mainbody 13a with the engaging projection 13b for the driving notch 15c of the outer differential cam 15 with the engaging projection 13b directing downward and eccentrically to the right seen from the front, the jaw driving cam $13_1$ of type 1 (inward fixing type) is formed. With the inverted eccentric driving pin $13c_1$ inserted with the pin eccentric to the left, the jaw driving cam $13_2$ of type 2 (outward fixing type) is formed. When the eccentric driving pin $13c_1$ is inserted in the main body 13a' with the engaging projection 13b' for the driving notch 16c of the inner differential cam 16 with the engaging projection 13b' directing downward and eccentrically to the left seen from the front, the jaw driving cam $13_3$ of type 3 (inward fixing type) is formed. With the inverted eccentric driving pin $13c_1$ inserted with the pin eccentric to the right, the jaw driving cam $13_4$ of type 4 (outward fixing type) is formed. And, when the non-eccentric nutral driving pin $13c_2$ is inserted in the mainbody 13a' with the engaging projection 13b or 13b' for the driving notch 15c or 16c of the outer or inner differential cam 15 or 16, the jaw driving cam $13_5$ of type 5 (positioning type) is formed. The jaw driving cam $13_5$ with the main body 13a' rotates driven by the outer or inner differential cams 15 or 16, but the non-eccentric jaw driving parts $13c_2$ keeps its nutral posture.

Accordingly, for the conversion of the jaw driving cam of 10 modes in all, it is necessary to prepare two each of the jaw driving cams of 5 kinds in interchanging system, but applying the conversion system for the jaw driving parts only, two each of the main body of two kinds remain constantly and 4 of eccentric type and 2 of nutral type of jaw driving part are enough for the conversion.

Figure 38:
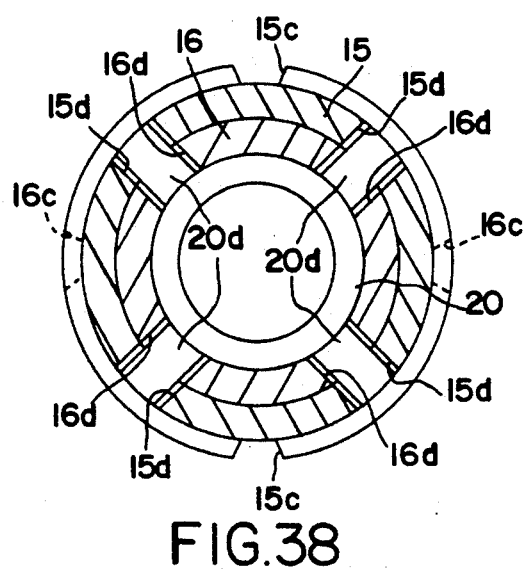

FIG. 38 shows another embodiment with the driving part 20d of the driving cam 20, in which two pairs of the driving parts 20d are provided on the diameters in two crossing directions and, corresponding to this, two pairs of long holes 15d and 16d are provided on the outer differential cam 15 and the inner differential cam 16 in two crossing directions. By increasing the number of the driving part 20d of the driving cam 20 as described above in pluralities of pairs the strength of the chuck can be increased.

The chuck with four differential jaws of the second type operates as follows. When, with a key inserted in a square hole 54 of the bevel pinion 53 provided on the periphery of the chuck body 30, and the driving disk 50 rotates, for instance clockwise seen from the front, and all of the top jaw 35 are free, not contacting to the object, both of the differential cams 39 and 40, in a locked state by the planet gears 51, rotates clockwise along arrow with the planet gears 51 as shown in FIG. 42. Here, in the embodiment shown, as one cam 42 of the pair of oposing operating cams 42, 43 of the outer differential cam 39 is formed to have a curve with increasing radius clockwise, the receiving members 48 of the master jaw 34 engaging therewith moves relatively decreasing their radii to cause one of the master jaw 34 to move toward the center of the chuck, while, as the other operating cam 43 is formed in a semi-circle with a constant radius, it does not rotate in spite of the rotation of the outer differential cam 39 and keeps its constant position.

Meanwhile, as the pair of oposing operating cams 45, 46 of the inner differential cam 40 is formed to have a curve with increasing radius clockwise, the receiving member 49 of the master jaw 34 engaging therewith and disposed on the other direction of diameter moves relatively decreasing their radii to cause both of the master jaws 34 to move toward the center of the chuck.

And then, if any one of the top jaws 35 contacts to the object to stop its movement and the rotation of the outer or inner differential cam 39 or 40 co-operating with the top jaw 35 is restricted, then, the planet gears 51 rotates, while revolving, and actuates the other differential cam to move the master jaw 34 relating thereto on the other direction. If the top jaw 35 contacts to the object to stop its movement, both of the outer and inner differential cams 39 and 40 in a state locked by the planet gears 51 receive driving force from the driving disk 50 to fix the object with even force in a mode of positioned on one direction and differential inward fixing on three directions. When the driving disk 50 is rotated in the reverse direction, an object with a central aperture can be fixed in a mode of one direction positioning and three direction inward fixing.

Figure 46:
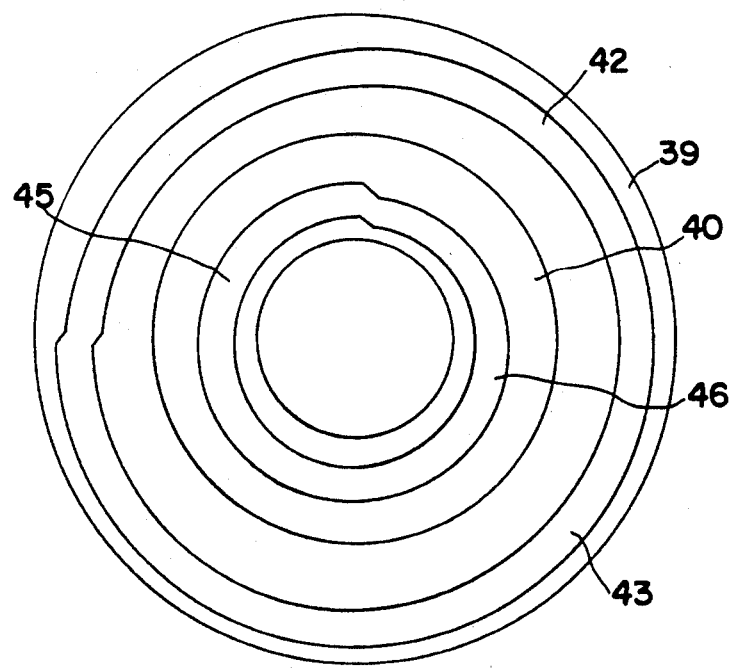

In FIG. 46, another embodiment of the chuck body 30 is shown. One cam 42 of the outer differential cam 39 is formed in a semi-circular curve with its radius increasing in clockwise seen from the front, and the other cam 43 is formed in a nutral semi-circle with a constant radius, while, one cam 45 of the inner differential cam 40 is formed in a nutral semi-circle with a constant radius, and the other cam 46 is formed in a semi-circular curve with its radius increasing in clockwise seen from the front. With the differential cam, a chuck of two direction positioning and two direction inward and outward fixing in two way is composed.

In the chuck capable of one direction positioning or two direction positioning described above, by forming the operating cam of the outer and inner differential cams, excluding the one in a nutral semi-circle with a constant radius, in a semi-circular curve with its radius increasing or decreasing, various positioning differential chuck with one each of inward jaw on the crossed directions and the other of outward jaw is composed to apply for positioning and holding object of a complicated shape.

Further, operating cams provided opposing on the outer and inner differential cams respectively described above can be provided in plurality of rows, and their configuration other than projected form described in the embodiment above can be changed arbitrarily to recessed form on both side, or one projected and the other recessed form.

INDUSTRIAL APPLICABILITY

In the chuck with four differential jaws of the first type of the present invention comprising four jaws two each held opposingly and slidably in jaw grooves formed in cross at right angle on a front face of a chuck body, a driving cam for differential cams movable by movement of a drawing bar in axial direction along the axis and rotatable around the axis, a set of cylindrical outer and inner differential cams each having a long hole provided in different angle to engage with said driving cam at the same time and being driven in counter directions by said movement of the driving cam in the axial direction so as to cause, when the rotation of one of said differential cams is restricted, the other differential cam is rotated differentially by the rotation and movement of the driving cam along the long hole on the restricted differential cam, and jaw driving cams each disposed inserted in a bore therefor provided in the chuck body and each consisting of an engaging projection to engage with one of said differential cams respectively and a jaw driving means to engage with each of said jaws, and further, said bore each being disposed on the center line of the jaw grooves formed in cross at right angle on a chuck body, and the jaw driving cams being formed to be capable of conversion to types for inward fixing, outward fixing and positioning, the chuck can be converted to be capable of, besides ordinary operation of four point inward fixing and four point outward fixing, various holding operations such as two point inward fixing and two point outward fixing, and further, of one point positioning and two point positioning, without exchanging the chuck body itself and by only interchanging the jaw driving cam or its jaw driving means. Accordingly, the chuck can hold by the most proper means corresponding to the objects of various irregular shapes. Moreover, as the operation is carried out in a single operation same as the conventional scroll chuck, even an unskilled operator can increase his productivity. Further, the chuck uses only one chuck as a base, the installing cost can be largely reduced rendering substantial economic effcts.

Further, in the chuck with four differential jaws of the first type, by providing a plurality of driving parts on the driving cam for differential cams, and, corresponding to the parts, by providing a plurality of long holes on each of the differential cams, the rigidity and capability against wearing of the chuck is improved to maintain precision and improve durability as well as to enable production of a larger and stronger chuck.

In the chuck with four differential jaws of the second type of the present invention comprising four jaws two each held opposingly and slidably in jaw grooves formed in cross at right angle on a front face of a chuck body, said chuck body containing an outer differential cam of a shape of a ring with an inner toothed gear and a pair of semi-circular operating cams disposed opposingly on one diameter, an inner differential cam of a shape of a disk with an outer toothed gear and a pair of semi-circular operating cams disposed opposingly on one diameter and a driving disk with planet gears each engaging with both of said inner and outer gears of the outer and inner differential cams at the same time, and further, one of the said operating cams disposed opposingly on one or both of the outer and inner differential cams being formed in a nutral semi-circle with a constant radius, and the other operating cam being formed in a semi-circular curve with increasing radius so as to hold a jaw engaged with the semi-circle operating cam in pre-determined position and to remove differentially a jaw engaged with the semi-circular curve with increasing radius along centrifugal or centripetal direction, a chuck with four differential jaws capable of one direction positioning or two direction positioning can be constructed, and moreover, by selecting an increasing or decreasing operating cams with a changing radius along the semi-circular curve, various holding operations of positioning and differential become possible, enabling positioning and holding of an object of an irregular shape without skilled experience and by a single operation same as the conventional three direction fixing scroll chuck or the chuck with four co-operating jaws of two direction differential and centripetal according to the preceeding invention rendering marked productivity.

Meanwhile, with the circular operation cams on the outer and inner differential cams formed in a shape of ribs connected on their ends to make a full circle, or by providing the operation cams in plural and parallel each other, rigidity and capability against wering are improved to maintain its precision and improvement of durability of the chuck as well as to enable production of a larger and stronger chuck.

I claim:

1. A chuck with four differential jaws comprising four jaws two each held opposingly and slidably in jaw grooves formed in cross at right angle on a front face of a chuck body, a driving cam for driving differential cams movable by movement of a drawing bar in axial direction along the axis and rotatable around the axis, a set of cylindrical outer and inner differential cams each having a long hole provided in different angle to engage with said driving cam at the same time and being driven in counter directions by said movement of the driving cam in the axial direction so as to cause, when the rotation of one of said differential cam is restricted, the other differential cam is rotated differentially by the rotation and movement of the driving cam along the long hole on the restricted differential cam, and jaw driving cams each disposed inserted in a bore therefor provided in the chuck body and each consisting of an engaging projection to engage with one of said differential cams respectively and a jaw driving means to engage with each of said jaws, and further, each said bore being disposed on the center line of jaw grooves formed in cross at right angle on a chuck body, and the jaw driving cams being formed to be capable of conversion to types for inward fixing, outward fixing and positioning.

2. A chuck with four differential jaws as defined in claim 1, wherein the means of conversion of jaw driving cam to types for inward fixing, outward fixing and positioning is to interchange each of the jaw driving cams provided with jaw driving means of types for inward fixing, outward fixing and positioning in the bores.

3. A chuck with four differential jaws as defined in claim 1, wherein the means of conversion of jaw driving cam to types for inward fixing, outward fixing and positioning is to interchange each of the jaw driving means of a type for inward fixing, outward fixing and positioning in the jaw driving cams.

4. A chuck with four differential jaws as defined in claim 1, wherein for said driving cam, a plurality of driving parts are provided, while, on the differential cam, a plurality of long holes are provided corresponding thereto.

5. A chuck with four differential jaws as defined in claim 2, wherein for said driving cam, a plurality of driving parts are provided, while, on the differential cam, a plurality of long holes are provided corresponding thereto.

6. A chuck with four differential jaws as defined in claim 3, wherein for said driving cam, a plurality of driving parts are provided, while, on the differential cam, a plurality of long holes are provided corresponding thereto.

* * * * *